June 29, 1943.  R. ANSCHÜTZ ET AL  2,322,996
CALCULATING MACHINE STORAGE DEVICE AND INDICATOR THEREFOR
Filed July 13, 1938  5 Sheets—Sheet 1

Inventors,
R. Anschütz
& R. Gröschel
By: Hancock Downing & Seebohm
Attys.

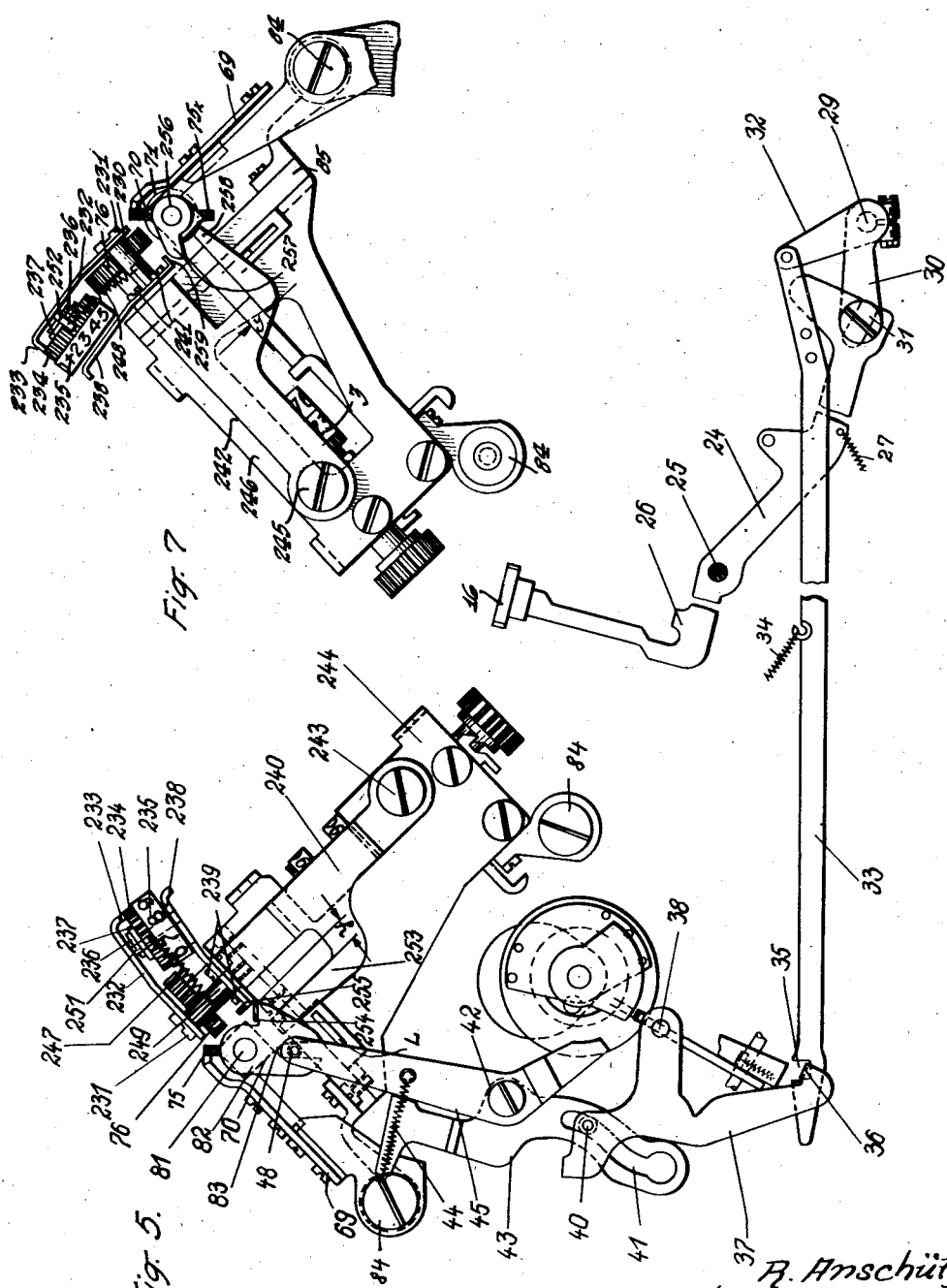

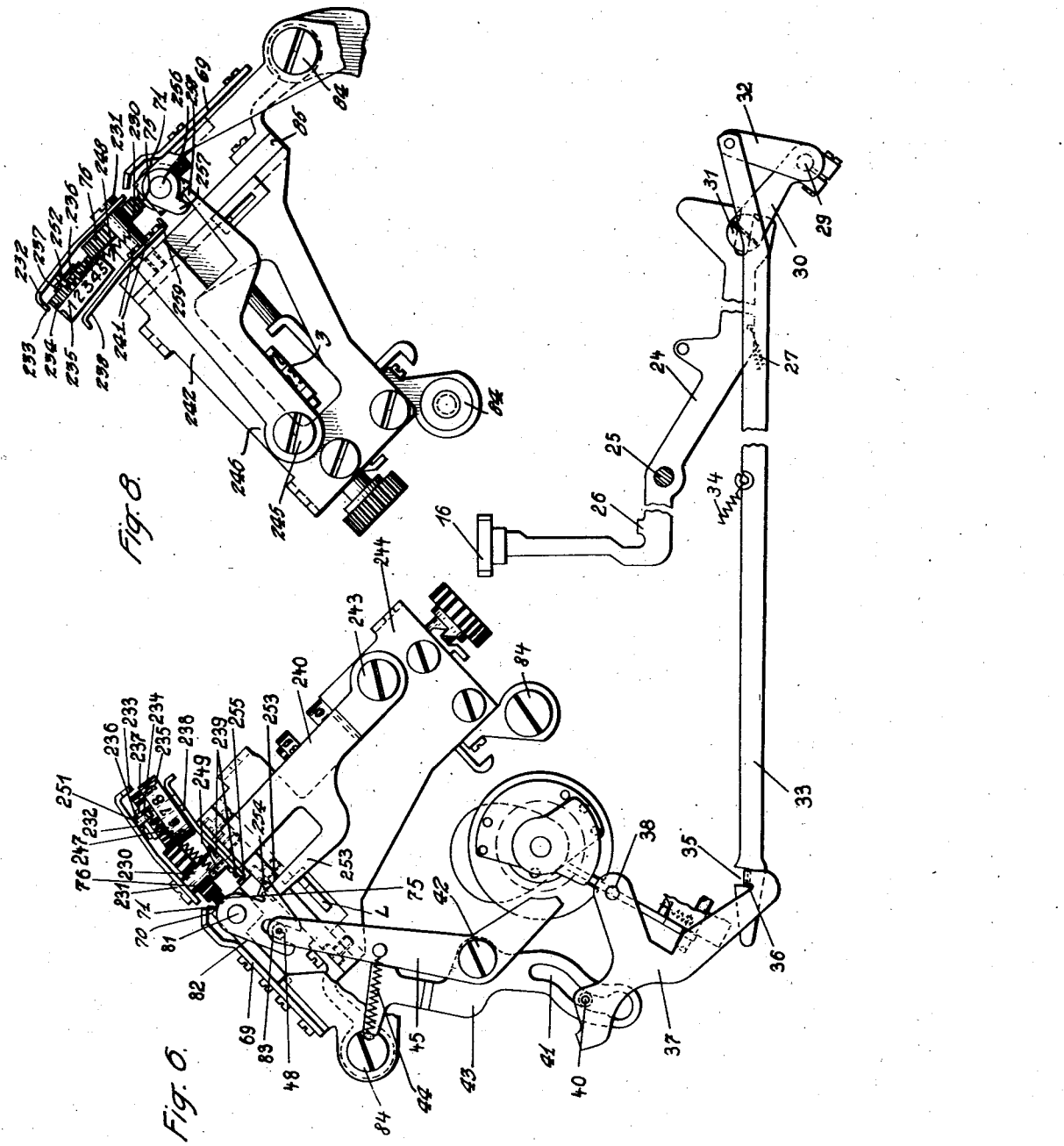

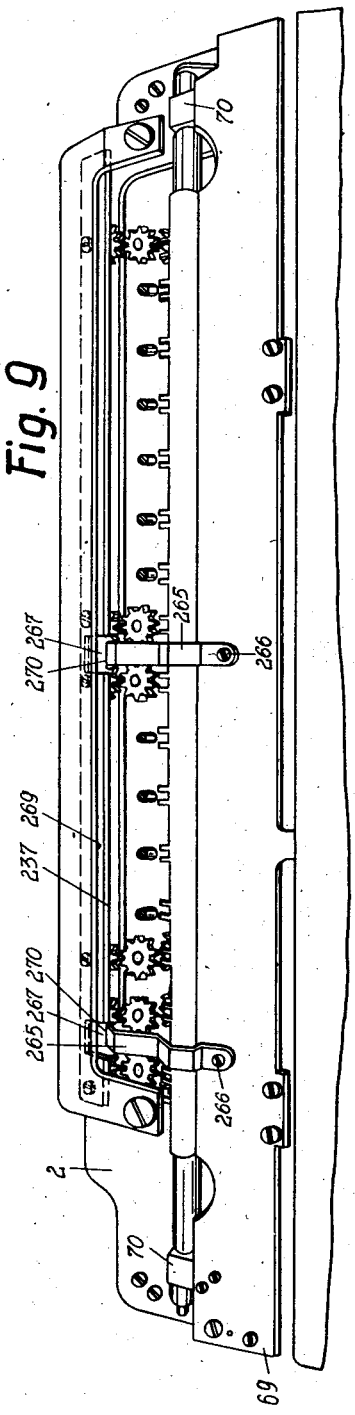
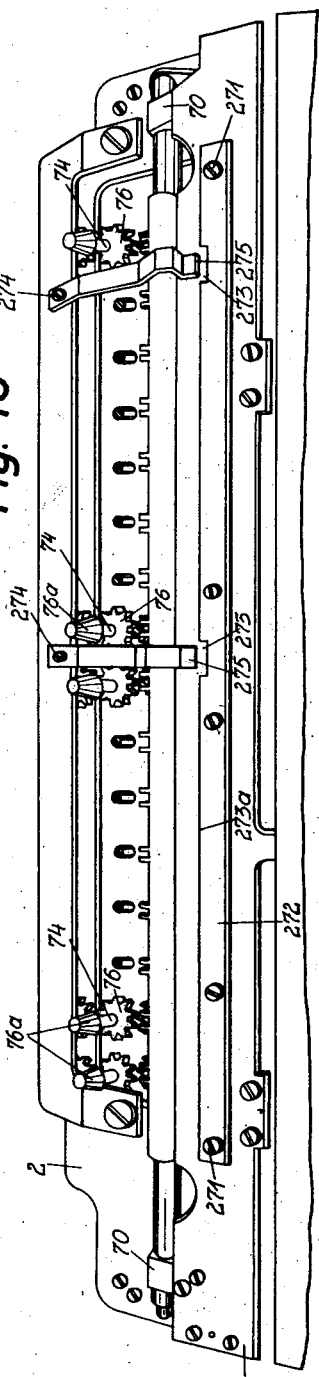

Patented June 29, 1943

2,322,996

UNITED STATES PATENT OFFICE 2,322,996

CALCULATING MACHINE STORAGE DEVICE AND INDICATOR THEREFOR

Robert Anschütz, Zella-Mehlis, and Richard Gröschel, Suhl, Germany; vested in the Alien Property Custodian Application July 13, 1938, Serial No. 219,077 In Germany July 20, 1937

16 Claims. (Cl. 235—73)

This invention relates to a calculating machine in which a transmission device is arranged between at least one of the totalizers on a carriage and a storage device. The storage device comprises a rotary member supporting storage gears and arranged transversely with respect to the axes of the numeral wheels in the totalizer and to the axes of the storage gears.

Machines of this type are known as, for instance, from the patent to Pott No. 2,173,635 but, as designed heretofore, they have the drawback that the values in the storage device cannot be inspected, since it is difficult to provide an indicator for this purpose, on account of the rotary arrangement of the storage device. On the other hand, an indicator is highly desirable.

This drawback is eliminated according to the invention by providing indicating members at that side of the numeral wheel shafts in the totalizer which is opposite the storage device, which members are arranged to be moved into and out of active position with respect to the shafts in dependence of the establishing operative and inoperative driving relation between the totalizer and the storage device.

In the accompanying drawings, an indicator according to the invention is illustrated by way of example as adapted to a calculating machine of the type known as the "Mercedes-Euklid."

In the drawings

Figs. 5 and 6 are elevations of mechanism arranged at the left-hand side of the machine and viewed in the direction of the arrow $a$ in Fig. 1, for connecting the storage key of the machine to the storage device, in the normal and in the depressed position of the key, respectively.

Figs. 7 and 8 are end elevations of the carriage, viewed from the right in Fig. 1 and showing the storage device and the indicating means disconnected from, and connected to, the totalizers, respectively.

Fig. 9 is a perspective illustration of a device for preventing accidental operation of the indicating means in a machine whose totalizer shafts are not equipped with means for manual operation, viewed from the rear of the machine.

Fig. 10 is a similar illustration of a device for the same purpose in a machine where the said means for manual operation of the totalizer shafts are provided.

Figure 1:
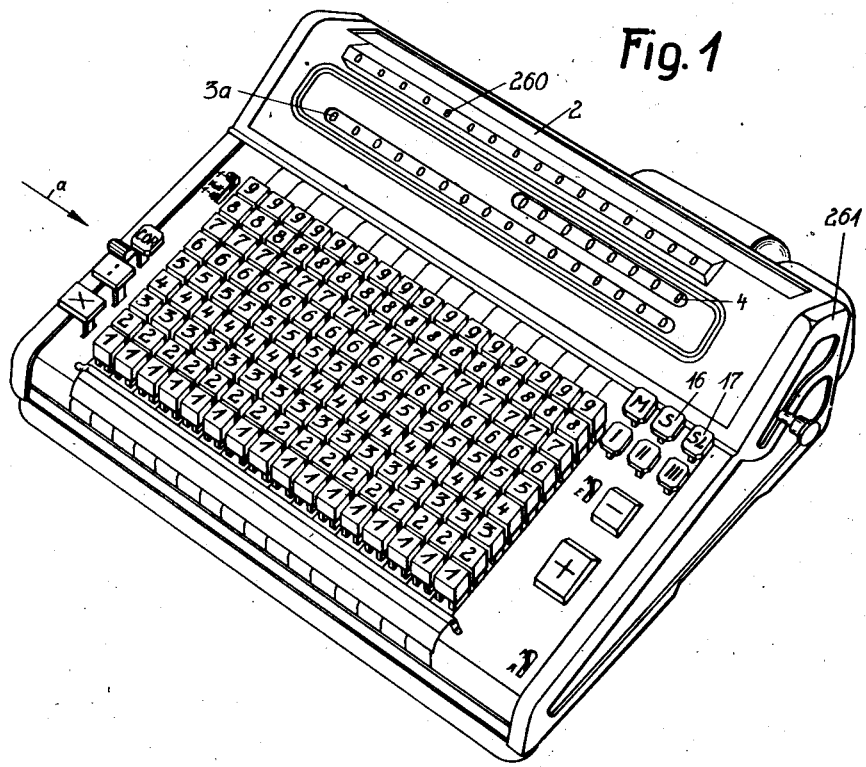
Fig. 1 is a perspective illustration of the machine.

Referring now to the drawings, and first to Fig. 1, the machine is enclosed in a casing and equipped with a keyboard for introducing values, and with special keys. Only the key 16 (S) and the canceling key 17 (SL) for the storage device come into consideration here. The carriage of the machine is arranged to slide in an elevated portion of the casing at the rear of the machine. The front wall of the elevated casing portion has a row of holes 3a for reading the numeral wheels on the totalizer shafts, a second row 4 (Figs. 1, 9 and 10) for reading the numeral wheels of revolution counters on the totalizer shafts, and a third row 260 for reading the numeral wheels of the indicator.

Figure 3:
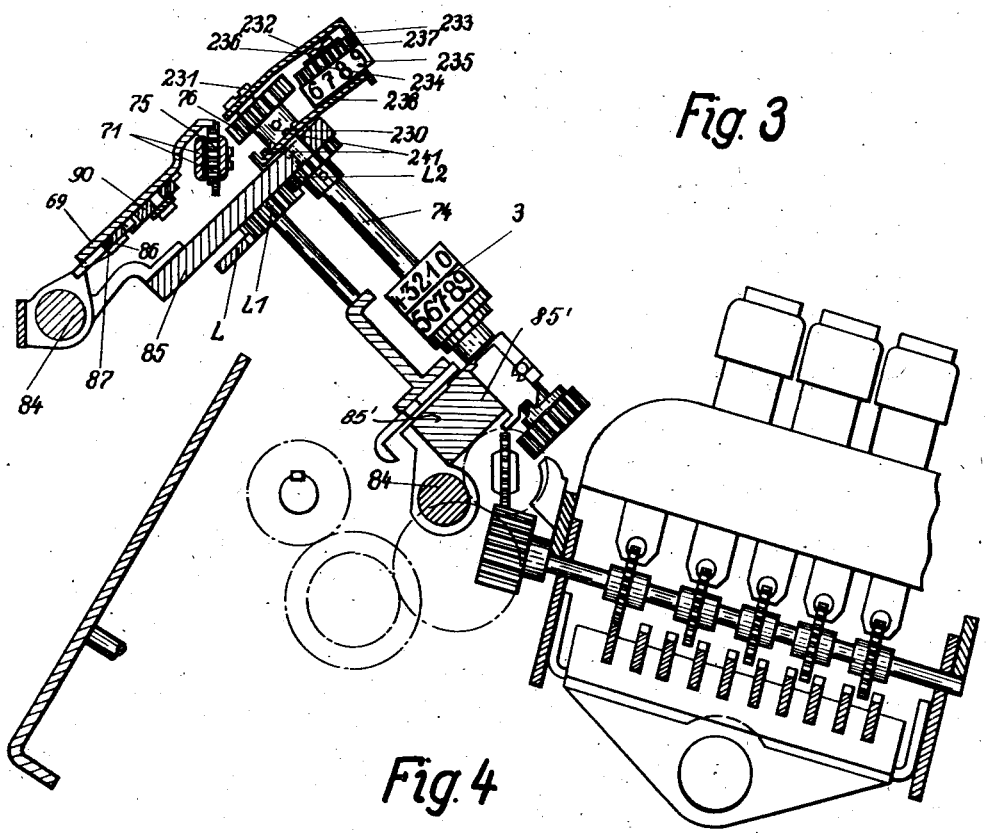
Fig. 3 is a central vertical section of the carriage, as viewed in the direction of the arrow $a$ in Fig. 1, and showing the storage device in its disconnected, or inactive, position.
Figure 4:
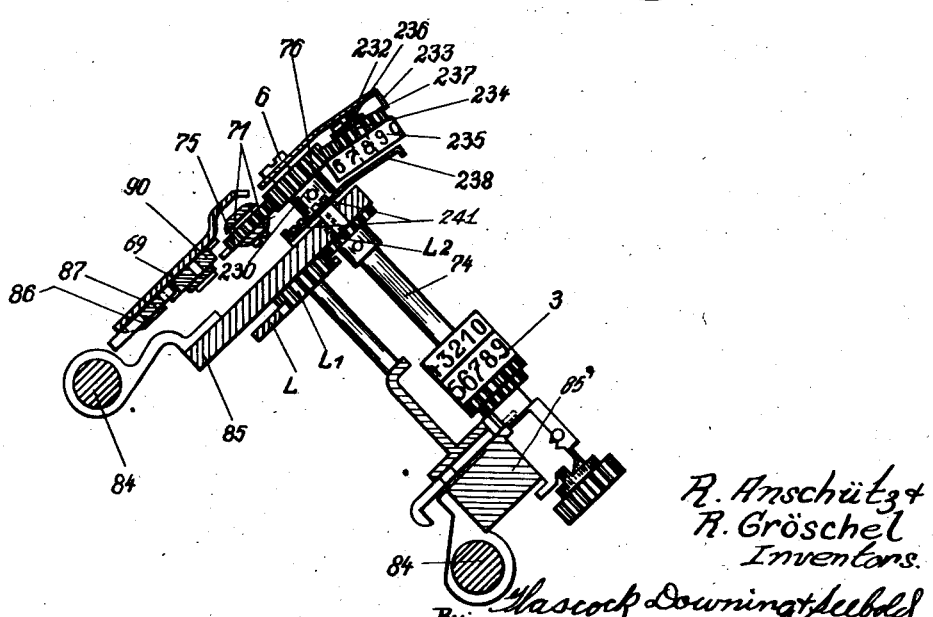
Fig. 4 is a similar illustration showing the storage device in its connected, or active, position.

Referring now to Fig. 3, the carriage 2 (Fig. 1) is mounted to slide on a pair of bars 84 through the medium of its upper rear plate 85 and its lower front plate 85'. An accumulator having sixteen orders is arranged on the carriage 2. Each order comprises a shaft 74 (Figs. 3 and 4) which is mounted to rotate in the plates, a numeral wheel 3, a spur gear $L_2$ below the rear plate 85 which meshes with the pinion $L_1$ which is driven by a rack L for cancelling the values from the totalizer, and a spur gear 76 above the rear plate 85.

The storage device includes a shaft 71 which has a central longitudinal slot for the reception of the storage gears 75. The shaft 71 is mounted to rotate in bearings 70 (Fig. 2) at its ends 81 (Figs. 2, 5, 6) and 256 (Figs. 7, 8). The bearings 70 are secured to the front side of a plate 69, Fig. 2, whose both ends are secured to the frame of the machine. At its upper edge, the plate is equipped with a pair of prongs for each storage gear 75 which engage a tooth of each wheel when the storage device is in its inactive position, Fig. 3, holding the gears against turning.

The indicator comprises a frame 238 (Figs. 2 to 8) the front side of which arms 240 and 242 are secured by screws 239 and 241, respectively; headed screws 243 and 245 arranged to turn in holes of the left hand end plate 244, Figs. 5 and 6, and of the right-hand end plate 246, Figs. 7 and 8, respectively, of the carriage 2; sixteen headed screws 236 (Figs. 3, 4, 5, 6); a spur gear 234 with a numeral wheel 235 on each headed screw; and a retaining strip 237 between the heads of the screws and the spur gears 234.

An arresting plate 232 is secured to the rear plate 85 of the carriage 2 by long screws 231 (Fig. 2) and distance sleeves 230 on the screws, and connected to the frame 238 by springs 247 and 248 secured to the frame at 249 and 250, and to the plate 232 at 251 and 252, respectively. At its upper end the arresting plate 232 has pairs of prongs 233, one for each indicator spur gear 234. The springs 247 and 248 pull the frame 238 toward the plate 232 until a tooth on each spur gear 234 has entered between the two corresponding prongs 233. This is the initial, or inactive, position of the indicator, as shown in Fig. 3.

The arm 240 at the left of the frame 238 has a rearwardly extending push rod 253 (Figs. 2, 5, 6) for cooperating with a lug 254 on a crank 82 on the end 81 of the shaft 71. At that end of the arm 240 which is secured to the frame 238 by the screws 239, a tooth 255 is arranged which also cooperates with the lug 254. A tooth 257 is keyed on the end 256 at the right-hand end of the shaft 71, Figs. 7 and 8, and a rearwardly extending push rod 258 is provided on the other arm 242 of the frame 238, for cooperation with the tooth 257. A tooth 259 is arranged at that end of the arm which is secured to the frame 238 by the screws 241 for cooperation with the tooth 257. In the initial, or inactive, position of the storage device, as illustrated in Figs. 5 and 7, the end of the push rod 253 on the arm 240 bears against the lower edge of the lug 254 on the crank 82, and the tooth 257 engages the tooth 259 from below.

Figure 2:
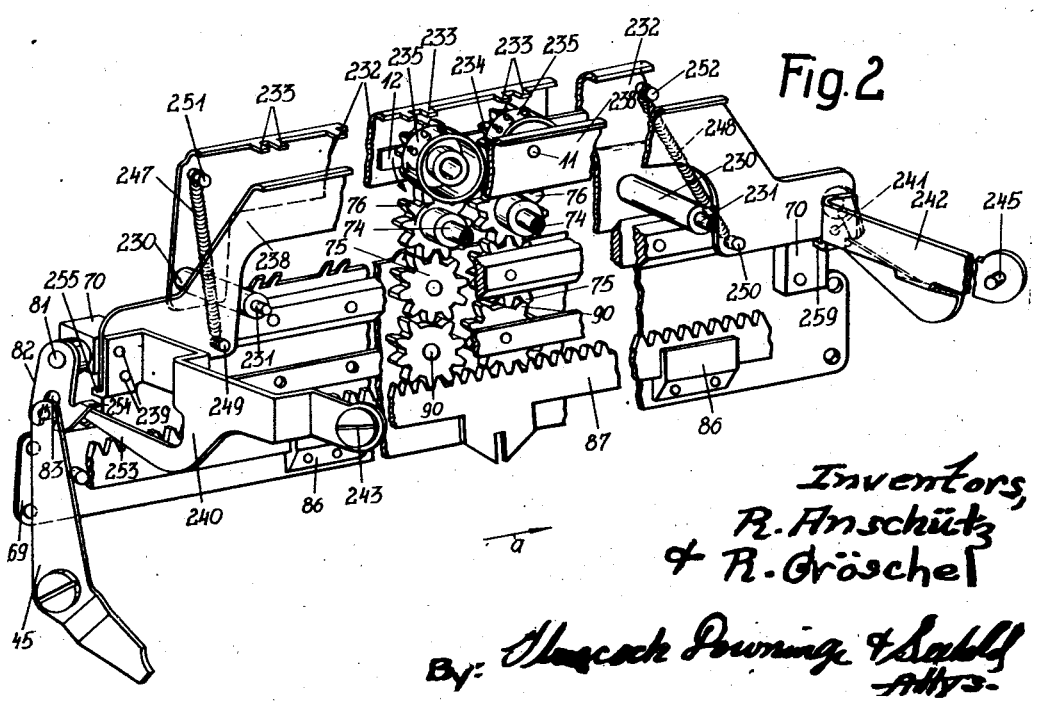
Fig. 2 is a perspective illustration of the storage device and the indicator, viewed from the front of the machine.

For canceling the values from the storage device 71, a rack 87, Fig. 2, is mounted to slide in brackets 86 on the front side of the plate 69. The rack, to which reciprocation is imparted by mechanism operatively connected to the tens transfer shaft of the machine but not illustrated, meshes with pinions 90 which, in turn, mesh with the storage gears 75.

Referring now to Figs. 5 and 6, the crank 82 which is on the left-hand end 81 of the shaft 71, has a slot 83 in its free end in which engages a pin 48 at the upper end of a lever 45. The lever and a link 43 (Figs. 5, 6) are mounted to swing on a headed screw 42 which is secured in the frame of the machine. A spring 44 connects the lever and the upper end of the link and pulls the lever against the upper end of the link. The link 43 has a slot 41 at its lower end in which engages a pin 40 at the upper end of a T lever 37. A lug 36 at the lower end of the T lever 37 engages in a notch 35 in the rear end of a connecting rod 33. The T lever is fulcrumed at 38. The front end of the connecting rod is pivotally connected to an arm 32 on the left hand end of a shaft 29 which is mounted near the front end of the machine frame. A spring 34 which is upwardly directed, pulls the connecting rod 33 to the rear and holds the bottom of its notch 35 against the lug 36 from below.

An arm 30 on the right-hand end of the shaft 29 is equipped with a headed screw 31 at its free end. The screw engages in a slot in the front end of a key lever 24 which at its rear end supports the storage key 16. The key lever 24 is fulcrumed at 25 and a spring 27 holds a projection 26 on the key lever against an abutment— not shown—and determines the initial position of the storage key.

When the key 16 is depressed, as shown in Fig. 6, the connecting rod 33 is pulled to the front and, through the means described, turns the lever 45 counter-clockwise. The pin 48 at the upper end of the lever turns the crank 82 and moves the storage device into its active position in which it is connected to the totalizers by its gears 75 meshing with the spur gears 76. While the storage device moves into active position, means operatively connected to the crank 82 move the indicator into its active position, as follows: When the crank 82 begins to turn, the lug 254 on the crank, and the tooth 257 release the noses 255 and 259 of the corresponding arms 240 and 242 and turn without effect through the distance y, whereupon they strike the upper edges of the push rods 253 and 258, respectively. The frame 238 is now turned about its screws 243 and 245 counter-clockwise, as viewed in Fig. 5, and against the urgency of the springs 247 and 248 until the indicator spur gears 234 are in mesh with the totalizer spur gears 76, and are clear of the prongs 233 at the upper edge of the arresting plate 232.

The operation of the indicator will be fully understood from the following example:

At first it may be assumed that a value that is to say "144" has been introduced in the first three orders of the totalizer from the right at a previously calculating operation in a manner known by "Mercedes Euklid calculating machines." When the canceling means L, L₁ and L₂ (Figs. 3, 4) are operated, the three orders of the totalizer are returned to zero as described in the above mentioned Patent No. 2,173,635, the two first ones from the right rotating through four places, and the third one rotating through one place. The totalizer shafts 74 rotate clockwise, and so the storage gears 75 and the indicator spur gears 234 rotate counter-clockwise, transferring the value 144 to the storage device and indicating it through the holes 260 of the cover plate 261. The accumulator key 16 is now released and springs 27 and 34 return the parts into their initial positions, Fig. 5, by turning the crank 82 anticlockwise. The lug 254 (Figs. 2, 5, 6) and the tooth 257 (Figs. 7, 8) now release the indicator frame 238 which is now returned into its initial position by springs 247 and 248. When the frame is nearly home, the lug 254 on the crank 82 and the tooth 257 act on the teeth 255 and 259 from below, accelerating the frame and making sure that the indicator spur gears 234 are disconnected from the totalizer spur gears 76 notwithstanding the rapid operation of the machine. Besides, the lug and the tooth lock the indicator frame in its inactive position. Otherwise, when the force of the springs 247 and 248 is momentarily weakened by an accidental shock, as may occur during the operation of the machine, the indicator spur gears might come into mesh with the totalizer spur gears 76 at the wrong time.

The values in the storage device are canceled by moving the rack 87 in the direction of the arrow a in Fig. 2 by depressing the canceling key 17 for the storage device. By means which have not been shown, the storage key 16 is depressed, as described in Patent No. 2,173,635, at the same time and the storage device is placed into active position. The canceling pinions 90 rotate the spur gears 76 of the totalizers anti-clockwise through the storage gears 75 so that the amount stored in the storage device is transmitted to the totalizers. The storage gears 75 return into their zero positions, and so do the indicator numeral wheel 235 which are rotated clockwise by the spur gears 76 of the totalizers through their own spur gears 234.

Means are preferably provided for preventing engagement of the indicator spur gears 234 with the totalizer spur gears 76 in any other than the normal position of the carriage 2. When the carriage 2 is moved to the left from its normal position, as viewed in Figs. 9 and 10, the tooth 255 (Figs. 2, 5, 6) of the arm 240 moves away from the lug 254 and the tooth 259 (Figs. 2, 7, 8) of the arm 242 moves away from the tooth 257. Now if in such a position of the carriage, that is, in any position except its normal position, the machine undergoes a shock, for instance, if its rear feet have been inadvertently placed on a book or the like, and the machine slides off the book and onto the table, the force of the springs 247 and 248 is weakened momentarily, and the spur gears 234 may get into mesh with the spur gears 76, so that the indications in the holes 260 are wrong. Such accidents are avoided by the devices illustrated in Figs. 9 and 10.

Referring now to Fig. 9, the retaining strip 237 on the indicator frame 238 is recessed at two points 267. In the normal position of the carriage 2, hooks 270 at the upper ends of two stops 265 are opposite the recesses 267. The stops are secured to the rear side of the plate 69 by screws 266. In the normal position, that is the position at the left-hand end of its stroke, as viewed in Fig. 1, of the carriage 2, the stops 265 do not interfere with the movement of the indicator into its active position, whose direction is indicated by the arrow 268 in Fig. 5, but when the carriage 2 is in any other than its normal position, the lower edge 269 of the retaining strip 237 is arrested by the end 270 of the stops 265, and the indicator spur gears 234 cannot mesh with the totalizer spur gears 76.

Referring now to Fig. 10, the shafts 74 of the totalizer gears are extended beyond the spur gears 76, and equipped with knurled handles 76a for turning the shafts. Obviously, stops like 265, which are secured to the plate 69, would interfere with the movement of the carriage 2. In this case, therefore, stops 275 are secured to the carriage by screws 274, and a strip 272 is secured to the plate 69 by screws 271, and recessed at 273 opposite the free ends of the stops 275. When the carriage is in its normal position, the recesses 273 are presented to the stops, and movement in the direction of arrow 268 is not interfered with, but in any other position of the carriage the stops are arrested by the straight edge 273a of the strip 272.

We claim:

1. In a calculating machine of the class described, in combination, a carriage, a totalizer on said carriage, a storage device, means to establish operative driving relation between said storage device and said totalizer, an indicator for said storage device, and means operatively connected to said first named means for establishing a driving connection between said indicator and said totalizer.

2. In a calculating machine of the class described, in combination, a carriage, a totalizer including numeral wheels, and shafts supporting said wheels on said carriage, a storage device including a rotatable member carrying shafts and storage gears arranged to rotate on the shafts carried by said member, said member being arranged transversely with respect to the numeral wheels shafts and to the storage gear shafts, means to establish operative driving relation between said storage device and said totalizer, an indicator for the storage device, and means operatively connected to said first named means for establishing operative driving relation between said totalizer and said indicator.

3. In a calculating machine of the class described, in combination, a carriage, a totalizer including numeral wheels and shafts supporting said wheels on said carriage, a storage device including a rotatable member carrying shafts and storage gears arranged to rotate on the shafts carried by said member, said member being arranged transversely with respect to the numeral wheel shafts and to the storage gear shafts, an indicator for the storage device, means for establishing operative driving relation between said totalizer and said indicator, and means to establish operative driving relation between said storage device and said totalizer, the second mentioned means being common to the first mentioned means.

4. In a calculating machine of the class described, in combination, a carriage, a totalizer on said carriage, a storage device, means to establish operative driving relation between said storage device and said totalizer, an indicator for said storage device, means operatively connected to said first named means for establishing a driving connection between said indicator and said totalizer, and common means to reset the storage device and indicator.

5. In a calculating machine of the class described, in combination, a carriage, a totalizer including numeral wheels and shafts supporting said numeral wheels, a storage device at one side of the shafts, means to establish operative driving relation between said storage device and said totalizer numeral wheels shafts, an indicator at the side of the shafts opposite the storage device, and means operatively connected to said first named means for establishing operative driving relation between said shafts and said indicator.

6. In a calculating machine of the class described, in combination, a carriage, a totalizer on said carriage, a storage device, means to establish operative driving relation between said storage device and said totalizer, a frame swingably arranged on said carriage, an indicator on said frame adapted to coact with said totalizer upon displacement of said frame, and means operatively connected to said first named means for displacing said frame and moving said indicator into operative driving connection with said totalizer.

7. In a calculating machine of the class described, in combination, a carriage, a totalizer on said carriage, a storage device, means to establish operative driving relation between said storage device and said totalizer, an indicator for said storage device operable by said totalizer, means for holding said indicator out of operative position with respect to said totalizer, and means operatively connected to said first named means for moving said indicator into operative driving relation to said totalizer against the action of said holding means.

8. In a calculating machine of the class described, in combination, a carriage, a totalizer on said carriage, a storage device, means to establish and disestablish operative driving relation between said storage device and said totalizer, an indicator for said storage device operable by said totalizer, means for moving said indicator out of operative position with respect to said totalizer, and means operatively connected to said first named means and including teeth, said first named means including locking members operable to coact with said teeth for ensuring disconnection of said indicator and said totalizer.

9. In a calculating machine of the class described, in combination, a carriage, a totalizer on said carriage, a storage device, means to establish operative driving relation between said storage device and said totalizer, means for locking said storage device when in its inoperative position, an indicator for said storage device, means operatively connected to said first named means for moving said indicator into operative driving and inoperative positions with respect to said totalizer, and means for locking the indicator of said storage device against operation when in its inoperative position with respect to said totalizer.

10. In a calculating machine of the class described, in combination, a carriage, a totalizer on said carriage, a storage device movably arranged on said carriage, a member for moving said storage device into operative driving and inoperative positions with relation to said totalizer, an indicator for said storage device operable by said totalizer, and means operatively connected with said moving member for moving said indicator into and out of driving relation with respect to said totalizer.

11. In a calculating machine of the class described, in combination, a carriage, a totalizer including totalizer gears on said carriage, a storage device operated through said totalizer gears, means to establish operative driving relation between said storage device and said totalizer gears, an indicator for said storage device operable by said totalizer, said indicator being driven in dependence on operation of said gears, and means operatively connected to said first named means for moving said indicator into and out of operative driving relation with respect to said gears.

12. In a calculating machine of the class described, in combination, a carriage having a normal position, a totalizer on said carriage, a storage device, means to establish operative driving relation between said storage device and said totalizer, an indicator for said storage device, means operatively connected to said first named means for moving said indicator into and out of operative driving relation with respect to said totalizer, said indicator being arranged on the opposite side of said totalizer in relation to said storage device, and means for locking the first named means against operation and for preventing movement of said indicator into engagement with said totalizer in any position other than the normal position of the carriage.

13. In a calculating machine of the class described, in combination, a carriage movably arranged in said machine having a normal position, a totalizer on said carriage, a storage device, means to establish operative driving relation between said storage device and said totalizer, an indicator for said storage device, means operatively connected to said first named means for moving said indicator into and out of operative driving relation with respect to said totalizer, and means in said movable carriage and a stop for holding said indicator in inoperative position in relation to said totalizer in any other than the normal position of said carriage, when there is an attempted operation of said first means.

14. In a calculating machine of the class described, in combination, a carriage, a totalizer on said carriage having a normal position, a storage device, means to establish operative driving relation between said storage device and said totalizer, an indicator for said storage device, means operatively connected to said first named means for moving said indicator into and out of operative driving relation with respect to said totalizer, and means including recesses in said carriage and a stop arranged on the machine, said stop being adapted to engage said recesses in normal position of said carriage.

15. In a calculating machine of the class described, in combination, a carriage, a totalizer on said carriage having a normal position, a storage device, means to establish operative driving relation between said storage device and said totalizer, an indicator for said storage device, means operatively connected to said first named means for moving said indicator into and out of operative driving relation with respect to said totalizer, and a stop on said carriage for holding said indicator in inoperative position in relation to said totalizer in any other than the normal position of said carriage, when there is an attempted operation of said first means.

16. In a calculating machine of the class described, in combination, a carriage, a totalizer on said carriage having a normal position, a storage device, means to establish operative driving relation between said storage device and said totalizer, an indicator, for said storage device, means operatively connected to said first named means for moving said indicator into and out of operative driving relation with respect to said totalizer, means including recesses and a solid edge portion between said recesses, and a stop on said carriage adapted to cooperate with said recesses when the carriage is disposed in its normal position and with said solid edge portion in all other positions of said carriage.

ROBERT ANSCHÜTZ.
RICHARD GRÖSCHEL.